(12) United States Patent
Gorczyca et al.

(10) Patent No.: US 11,029,092 B2
(45) Date of Patent: Jun. 8, 2021

(54) MAGNETIC ENERGY HARVESTING DEVICE AND METHOD FOR ELECTRIC METALLURGICAL FURNACES AND SIMILAR ENVIRONMENTS

(71) Applicant: HATCH LTD., Mississauga (CA)

(72) Inventors: Matthew Gorczyca, Toronto (CA); Terry Gerritsen, Oakville (CA)

(73) Assignee: HATCH LTD., Mississauga (CA)

( * ) Notice: Subject to any disclaimer, the term of this patent is extended or adjusted under 35 U.S.C. 154(b) by 396 days.

(21) Appl. No.: 15/974,799

(22) Filed: May 9, 2018

(65) Prior Publication Data

US 2018/0328668 A1    Nov. 15, 2018

Related U.S. Application Data

(60) Provisional application No. 62/504,468, filed on May 10, 2017.

(51) Int. Cl.
*H05B 7/144* (2006.01)
*F27D 11/10* (2006.01)
(Continued)

(52) U.S. Cl.
CPC ............ *F27D 11/10* (2013.01); *H01B 9/001* (2013.01); *H02J 50/10* (2016.02); *H02J 50/80* (2016.02); *H05B 7/11* (2013.01); *H05B 7/18* (2013.01)

(58) Field of Classification Search
CPC .......... H01B 9/001; F27D 11/10; F27D 11/11; H05B 7/11; H05B 7/18; H02J 50/001;
(Continued)

(56) References Cited

U.S. PATENT DOCUMENTS 7,808,236 B1    10/2010   Huang et al.
8,519,554 B2 *   8/2013   Kaplan ................... F03B 17/06
                                               290/1 R
(Continued)

FOREIGN PATENT DOCUMENTS

CA    2752096 C      8/2016
WO    2011106506 A2  9/2011
WO    2013092305 A1  6/2013

OTHER PUBLICATIONS

International Patent Application No. PCT/CA2018/050550, International Search Report and Written Opinion dated Jul. 17, 2018.
(Continued)

*Primary Examiner* — Hung D Nguyen
(74) *Attorney, Agent, or Firm* — Borden Ladner Gervais LLP; Brandon L. Evenson (57) ABSTRACT

An electronic device, and a magnetic energy harvesting device and method of harvesting magnetic energy, for electric metallurgical furnaces and similar environments. The device comprises a conductor which is configured to become induced with electricity in response to a time-varying magnetic field. The field may be irregular, such as near a metallurgical furnace or a similar environment. The electronic device may be a transmitter in a metallurgical electric furnace. The transmitter may be connected to an environment sensor. The electronic device may be powered by the magnetic energy harvesting device. The magnetic energy harvesting device may a wire loop or a coil. The method comprises inductively harvesting energy from magnetic field fluctuations caused by a metallurgical furnace or a similar environment to wirelessly power the electronic device.

23 Claims, 9 Drawing Sheets

(51) Int. Cl.
*H05B 7/11* (2006.01)
*H02J 50/80* (2016.01)
*H01B 9/00* (2006.01)
*H02J 50/10* (2016.01)
*H05B 7/18* (2006.01)

(58) Field of Classification Search
CPC .. H02J 50/10; H02J 50/12; H02J 50/40; H02J 50/50; H02J 50/70; H02J 50/80; H02J 50/90
USPC .................................. 373/102, 104, 107, 108
See application file for complete search history.

(56) References Cited

U.S. PATENT DOCUMENTS

| | | |
|---|---|---|
| 8,594,956 B2 | 11/2013 | Banting et al. |
| 2004/0127895 A1* | 7/2004 | Flock ..................... A61B 18/14 606/41 |
| 2005/0162167 A1 | 7/2005 | Heid et al. |
| 2012/0278003 A1* | 11/2012 | Turner ................. G01N 33/205 702/23 |
| 2015/0008751 A1 | 1/2015 | Widmer et al. |
| 2016/0261233 A1 | 9/2016 | Pohl et al. |
| 2017/0133134 A1 | 5/2017 | Pohl et al. |

OTHER PUBLICATIONS

Roscoe et al., "Harvesting Energy From Magnetic Fields to Power Condition Monitoring Sensors," IEEE Sensors Journal, Jun. 2013, vol. 13 (6), pp. 2263-2270.

International Patent Application No. PCT/CA2018/050550, International Preliminary Report on Patentability dated Nov. 21, 2019.

* cited by examiner

MAGNETIC ENERGY HARVESTING DEVICE AND METHOD FOR ELECTRIC METALLURGICAL FURNACES AND SIMILAR ENVIRONMENTS

CROSS-REFERENCE TO RELATED APPLICATION

This application claims priority to U.S. patent application Ser. No. 62/504,468 filed May 10, 2017 which is incorporated herein by reference in its entirety.

FIELD

The present disclosure relates to electric metallurgical furnaces and to other industrial environments which experience a similar time varying magnetic field. More specifically, the present disclosure relates to devices, including transmitters, for electric metallurgical furnace environments and other environments which experience a similar time varying magnetic field, and methods for harvesting magnetic energy to power electronic devices.

BACKGROUND

A metallurgical furnace is used to separate solid matter containing metals into desirable materials and undesirable materials. The metallurgical furnace uses high heat to smelt or melt the solid matter into its component parts. The component parts stratify within the furnace based on density allowing for their individual removal from the furnace.

A metallurgical furnace may be an electric metallurgical furnace, or a non-electric metallurgical furnace (often referred to as a flash furnace). An electric metallurgical furnace (also referred to as an electric arc furnace or electric smelting furnace) comprises one or more electrodes. The electrodes receive high power electricity from a power supply to generate heat in the furnace by electric arc(s) and/or resistance heating of the materials being smelted/melted. An electric metallurgical furnace may operate at a temperature as high as 1500-2000 degrees Celsius. The electrical current in the electrodes is typically an alternating current, and may be as high as 150 kiloamperes (kA). The high current used in the operation of an electrical furnace produces a very strong time-varying magnetic field throughout the furnace environment.

An electric metallurgical furnace requires significant supporting infrastructure to operate. Much of this supporting infrastructure is within the metallurgical furnace environment. Equipment and process monitoring of the electric metallurgical furnace also needs to occur. Industrial instrumentation is typically used to perform such equipment and process monitoring. Industrial instrumentation typically comprises one or more sensors for taking readings, and a transmitter for conditioning the readings from the sensors and communicating the readings to a base station/centralized monitoring and control system. Although called a "transmitter", such devices typically comprise a transmitter and a receiver (or a transceiver), and other supporting electronic components for connecting to sensors, acquiring readings from such sensors, storing the readings, and communicating those readings using the transmitter and receiver to a base station/centralized monitoring and control system. A transmitter is typically electrically connected to the sensor(s) to take readings. The connection may be an analog 4-20 mA current loop. Sensors typically do not require any power to operate. Some sensors may require power, in which cases the transmitter would typically provide such power.

Readings from the industrial instruments can be critical to ensuring the safe and effective operation of the furnace environment. An electrical metallurgical furnace could have hundreds to thousands of instruments disposed throughout the environment. Such furnace environments may comprise multiple stories and cover a large geographic area. And there may be many personnel safety exclusion zones containing industrial instrumentation. For example, there may be large areas where it is too dangerous for a person to access because several thousand volts may be present along with elevated temperatures and the risk of exposure to hazardous gases/dust.

Conventional transmitters receive their electrical power from a power source at some distance from the transmitter through power cables. Transmitter power cabling is designed, procured, installed, and terminated. Ancillary equipment, such as power cable trays, junction boxes, and marshalling cabinets are typically used to manage this power cabling. A transmitter may be loop powered which is also referred to as a 2-wire transmitter. Such transmitters receive their electrical power along the same two conductive wires which provide for communication between the transmitter and a base station/centralized monitoring and control system. In this regard, a transmitter wire may power the transmitter and provide data communication to/from the transmitter. If the transmitter is externally powered (i.e. it is powered by wires which are separate from its data communication wires), the transmitter is referred to as a 4-wire transmitter.

The environment of a high-power electric metallurgical furnace can cause significant issues, however, with conventional power/communication cables. The strong magnetic fields from the high-current electrodes induce undesired current in the power/communication cables. This undesired current may be 100 amperes or higher and can destroy the electronic components in which the cables terminate, such as transmitters.

Furthermore, power/communication cables may need to traverse objects in the furnace environment which experience circuiting currents such as the metal support beams of the roof of the furnace. Although power/communication cables typically include a vinyl insulation cover and additional thermal protection, the protective covers can degrade along the length of the cable. If a power/communication cable contacts an object heated by circulating currents (such as a metal support beam), it could cause the cable to fail developing a short or open circuit or contact with a high potential. This would at least cause a loss of data and at worst force a furnace shutdown resulting in lost production, and even jeopardize the safety of personnel.

Efforts have been made to reduce the impact of magnetic field induced currents in transmitter power and communication (also referred to as data) cables. Transmitter power cabling may be protected from overcurrent with breakers. And isolation transformers are sometimes used to electrically isolate the transmitters from the cables providing their power. Instrument data cabling tends to be more susceptible to damage in the strong magnetic field environment. Isolators are sometimes used to provide galvanic isolation for the data cables. But isolation transformers and isolators add design complexity and can significantly increase the overall cost of implementing industrial instrumentation due to the large number of instruments required in a furnace environment.

DETAILED DESCRIPTION

In accordance with an embodiment of the present disclosure, a device such as a wireless transmitter is powered entirely by the time-varying magnetic field of an electric metallurgical furnace. The fluctuating magnetic field is caused by the high currents generated in conducted materials because of the operation of the electric metallurgical furnace. The device comprises a magnetic energy harvesting device. The harvesting device converts fluctuations in the time-varying magnetic field in the environment into a local source of electrical energy to power the device. In effect, the harvesting device uses the previously problematic time-varying magnetic field generated by the furnace to eliminate the need for device power/communication cables altogether. The harvesting device may comprise a coil. The harvesting device may also comprise a core to help concentrate, optimally align, or align and concentrate, the magnetic field relative to the coil.

In an embodiment of the present disclosure, the electronic device comprises an interface for receiving readings; a transmitter configured to transmit the readings to a remote device; and a magnetic energy harvesting device configured to supply power to the electronic device in response to an irregular time-varying magnetic field. The magnetic energy harvesting device may be configured to supply power to the electronic device in response to a time-varying magnetic field from a metallurgical electric furnace. The electronic device may be a wireless transmitter, and the interface may be a sensor interface for receiving readings from a sensor, and the electronic device may be configured to wirelessly transmit the sensor readings to a remote device. The magnetic energy harvesting device may be configured to supply the power in response to a time-varying magnetic field of a metallurgical furnace having an electrode that is located from a coil of the magnetic energy harvesting device a distance greater than 10 times the outer diameter of the coil. The magnetic energy harvesting device may be configured to supply the power in response to a time-varying magnetic field resulting from a plurality of conductors in the metallurgical furnace. The magnetic energy harvesting device may be configured to supply less than 1500 microwatts of electrical power to the electronic device. The magnetic energy harvesting device may be configured to supply a minimum of 300 microwatts of electrical power to the electronic device. The electronic device may further comprise an energy storage device, the energy storage device configured to store excess electrical power from the harvesting device when the harvesting device produces more electrical power than required by the electronic device, and output electrical power when the harvesting device produces less electrical power than required by the electronic device. The magnetic energy harvesting device may be configured to produce a minimum of 300 microwatts of electrical power in the wireless transmitter in response to a minimum magnetic flux density of 0.2 millitesla, at an average frequency of approximately 50 or 60 hertz. The coil of the harvesting device may comprise a magnet wire having a gauge between 20 and 39 AWG. The coil may comprise between 210 and 21,000 turns. The electronic device may comprise a core disposed within the coil, the core comprised of a material having a greater magnetic permeability than air, the core to one or more of reorient the and concentrate the magnetic field through the coil. The core may comprise an end extending beyond the circumference of the coil to concentrate the magnetic field strength within the coil. The core may comprise an end extending beyond the circumference of the coil in a plurality of directions. The core may comprise a plurality of C-shaped bars. The end of the core may be disc-shaped. The core may be a housing for the coil.

In another embodiment, the electronic device comprises a magnetic energy harvesting device that is configured to be induced with electricity, for powering the electronic device, in response to a time-varying magnetic field from a metallurgical furnace. The electronic device may be a wireless integrated industrial instrument comprising an environment sensor and a wireless transceiver configured to wirelessly transmit readings of the environment sensor to a data acquisition device. The electronic device may be a data acquisition device. The harvesting device may comprise a wire loop or a coil. The harvesting device may comprise conductive equipment in the environment, such as a railing. The wire loop may be arranged in the form of a coil configured to harvest magnetic energy. The wire loop may be one or more conductors arranged to induce electricity from a time-varying magnetic field.

In another embodiment, a method for powering a device in an environment having a time-varying magnetic field comprises receiving an irregular time-varying magnetic field; inducing an electrical current in response to the irregular time-varying magnetic field; and powering the device with the electrical current. Receiving the irregular time-varying magnetic field may comprise receiving the time-varying magnetic field from a metallurgical furnace. The device may be a transmitter, the magnetic field may be equal to or greater than 0.2 millitesla, the frequency of the fluctuations may be approximately 50 or 60 hertz, and the electrical current may be equal to or greater than 0.1 milliamperes. The method may further comprise charging an energy storage device, then discharging the energy storage device to provide sufficient power for wirelessly transmitting data from the device to a remote device.

In another embodiment, a magnetic energy harvesting device comprises a coil and a core, the core comprising an end extending beyond the circumference of the coil.

Figure 1:
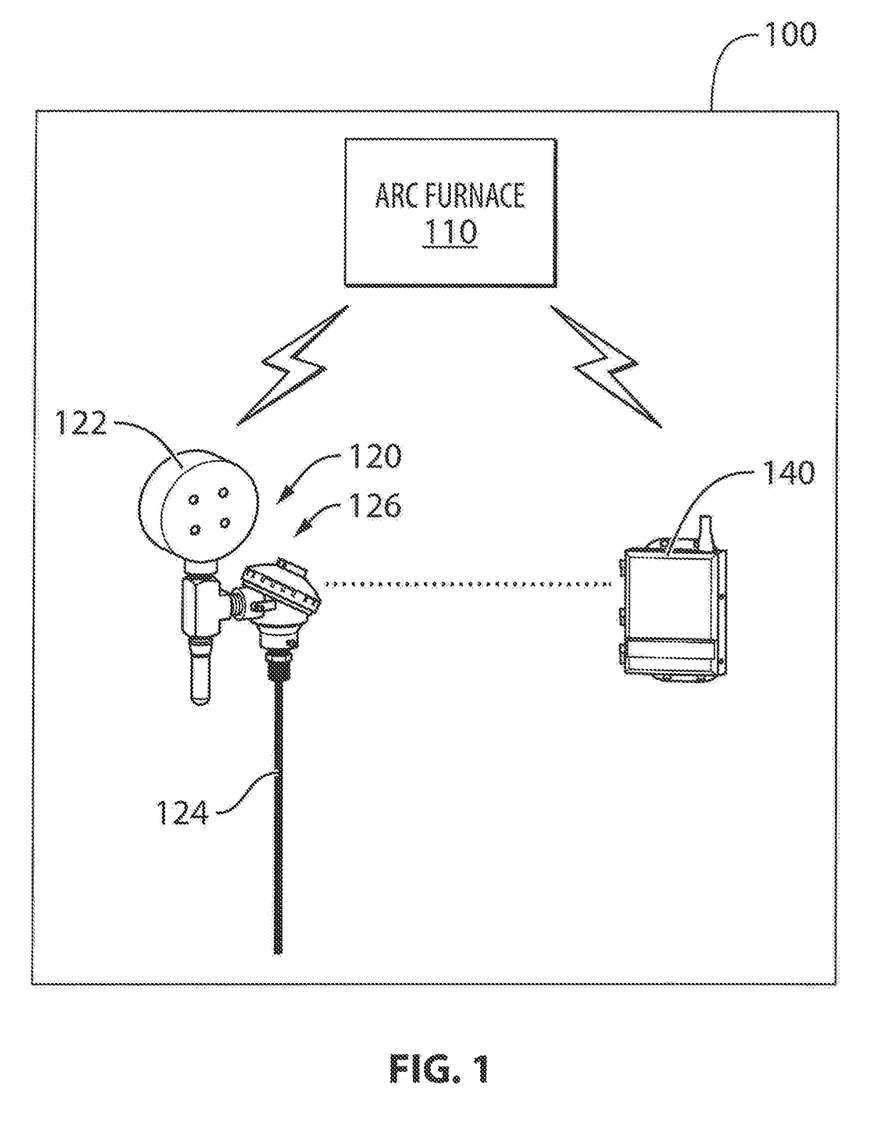
FIG. 1 shows a representation of an industrial environment with an electric arc furnace and a wireless integrated industrial instrument in accordance with an embodiment of the present disclosure.

FIG. 1 shows a representation of an industrial environment 100 with an electric arc furnace 110, a wireless integrated industrial instrument 120 (also referred to herein as an integrated instrument) according to an embodiment of the present disclosure, and a wireless base station 140. The electric arc furnace 110 produces a time-varying magnetic field throughout the environment 100. The integrated instrument 120 comprises a magnetic energy harvesting device 122 which uses the time-varying magnetic field within its vicinity (i.e. which it is receiving) to generate electricity for the electronic components of the integrated instrument 120. In other words, the magnetic energy harvesting device 122 is induced with electricity in response to being in the presence of a time-varying magnetic field. The time-varying magnetic field may, for example, have a base frequency of about 50 or 60 hertz (Hz). The periodic events defining a cycle of a time-varying magnetic field may be the changes in the magnetic field direction which reach a threshold amount.

The integrated instrument 120 comprises a sensor 124 and a wireless transmitter 126. The electricity generated by the magnetic energy harvesting device 122 may be sufficient to power the electronic components of the wireless transmitter 126, and also power the sensor 124 if the sensor 124 requires power. The sensor 124 is used to obtain environmental data, such as temperature readings. The sensor 124 may be, for example, a thermocouple. The transmitter 126 obtains sensor readings from the sensor 124 and wirelessly communicates the readings as data to the wireless base station 140. The wireless base station 140 provides a gateway to transfer the data to a centralized monitoring and control system for processing, amalgamation with other sensor data, and reporting.

The magnetic energy harvesting device 122 comprises conductors which are configured to be induced with electricity in the presence of the time varying magnetic field of a metallurgical furnace or similar environment. The conductors may be a coil of wire, a wire loop, or even other equipment that is located in the environment such as a railing which can accomplish the intended purpose. The features of the magnetic energy harvesting device 122 (such as the diameter of the coil, the number of turns of wire in the coil, and the gauge of the wire in the coil) may be optimized for the magnetic field that is expected in the environment generally, or at the specific location of the integrated instrument 120.

Figure 2:
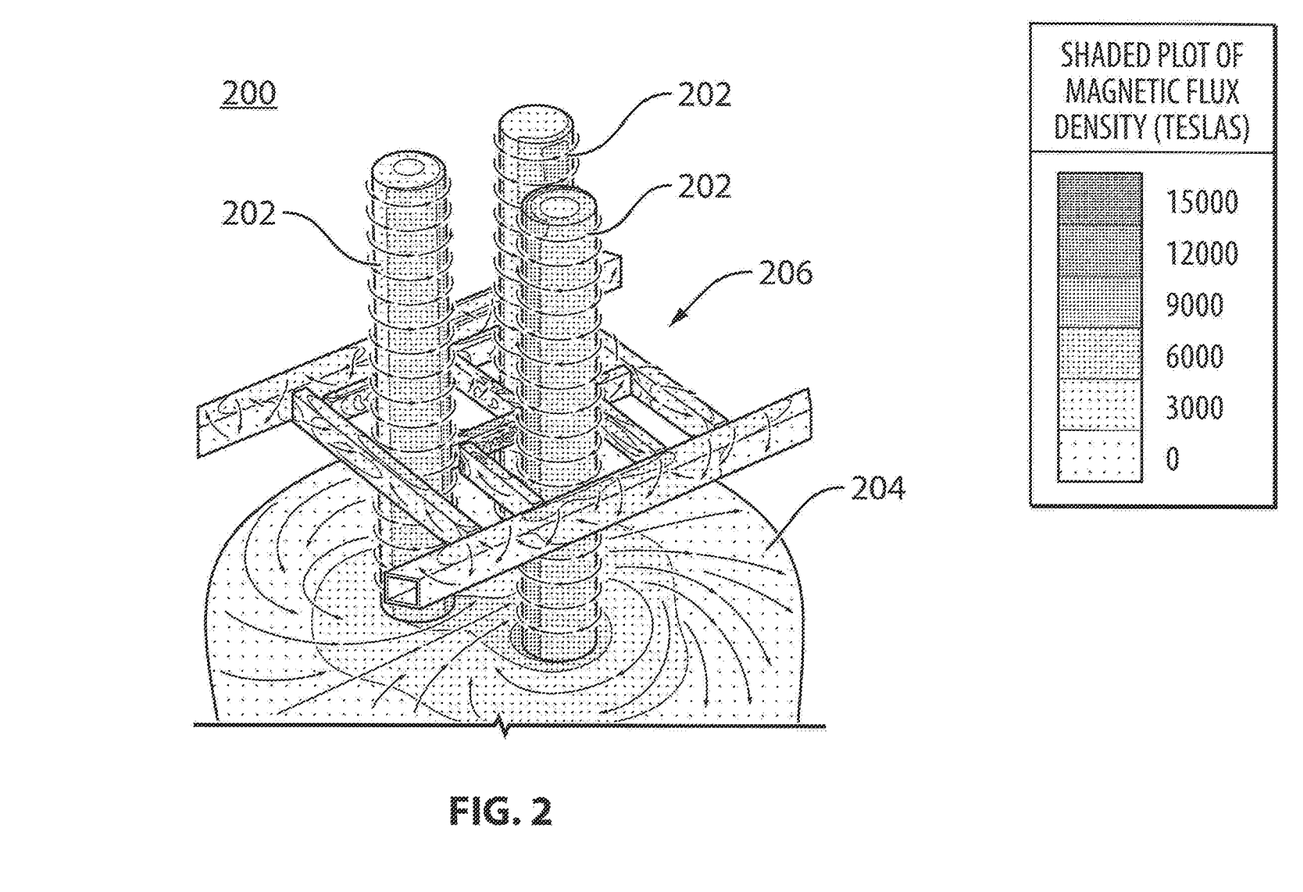
FIG. 2 shows a representation of an electric metallurgical furnace with magnetic field lines shown as directional arrows across surfaces in the furnace.

FIG. 2 shows a representation of a portion of an electric metallurgical furnace 200 with magnetic field lines shown as directional arrows across surfaces in the furnace 200. An electric metallurgical furnace (also referred to as an electric arc furnace or electric smelting furnace) comprises one or more electrodes. The furnace 200 of FIG. 2 shows three electrodes 202. The electrodes 202 are spaced from each other by a distance and placed proximate to materials 204 in the furnace. A high level of current is conducted through the electrodes 202 which heats the materials 204 in the furnace by electric arc(s) and/or resistance heating. This heat then smelts or melts the materials 204. The high current flowing through the electrical components of the furnace (which includes the electrodes, busbars, flexible conductors, current clamps, transformers, etc.) and the materials in the furnace being melted/smelted (together, with the electrical components, collectively referred to herein as conductors), in combination with the larger distances separating the conductors, generates a strong magnetic field which covers a large physical area. For a smelting electric arc furnace, the current in the electrodes may be around 20 kA.

A magnetic field is the magnetic effect created by electric currents or magnetized materials. The magnetic field at a given point in space and time is characterized by a direction and a magnitude. The magnitude is also referred to as magnetic flux density. Electrodes in many metallurgical furnaces are powered with alternating current. Accordingly, the alternating current of the furnace causes the conductors to generate a time-varying magnetic field. This alternating current is typically at a low frequency of approximately 50 Hz or 60 Hz. A time-varying magnetic field means either or both, direction and flux density of the magnetic field changes over a period of time. The form of energy of a time-varying magnetic field is distinctly different from the form of energy of electromagnetic radiation. Electromagnetic radiation (such as a laser beam) consists of electromagnetic waves which are synchronized oscillations of electric and magnetic fields that propagate in straight lines away from their source over long distances. By contrast, magnetic fields tend to form closed loops between the poles of a magnet and their effects are contained within relatively short distances.

The orientation of a magnetic field caused by the operation of an electric metallurgical furnace is typically irregular for a large region around the sources of the field. Each of the direction and flux density of a magnetic field at a particular physical location can also vary significantly over time in an electric metallurgical furnace environment. In contrast, other industrial environments may have more uniform flux densities, and/or magnetic field directions which are more orderly. For example, another industrial environment may have a magnetic field which has an approximately fixed direction and reverses its magnitude between cycles at a particular location in the environment.

Another environment that typically generates a time-varying magnetic field is an electricity transmission environment. Electricity transmission systems comprise wires which are spaced apart by a distance. Each wire carries a different phase of a high alternating current. Electricity transmission and distribution environments have a much more uniform time-varying magnetic field comprising straighter field directions than the time-varying magnetic field resulting from the operation of an electric metallurgical furnace. This is in part because the wires in electricity transmission and distribution system environments are closely spaced and configured to carry electricity between two distinct points without energy spilling into the surrounding environment. The source of the magnetic field in such environments may also be closely surrounded by other components. The closer two conductors are spaced, the smaller the magnetic field area. For example, a pair of conductors to a single distribution transformer may be spaced apart by around 30 centimeters.

Induction can wirelessly charge battery powered electronics, but such applications require two tightly-coupled coils: a power transmitter coil and a receiving coil. The separation between the two coils must be very small; usually only a fraction of the diameter of the receiving coil. The coils must also be aligned in a particular orientation with respect to one another. The frequency of the time-varying magnetic field in such applications is relatively high—typically above 100,000 Hz (100 kHz) and sometimes above 6,000,000 Hz (6 MHz). These high frequencies help avoid inductive heating issues associated with tightly-coupled inductive coil systems operating at lower frequencies, but propagate a portion of the energy via electromagnetic radiation (radio frequency). A higher frequency may also be used because it produces a voltage in the receiving coil which is better suited for powering the electronic device attached to the receiving coil. This is because the voltage induced in the receiving coil is related to the time rate of change of the magnetic field. Also, a higher frequency generally means the electrical components can be smaller so the components take up less space in a battery-powered electronics device (such as a mobile phone), which is typically designed to be small and portable. By contrast, in an electric metallurgical furnace, the distance between a pair of conductors may be quite large (e.g. between 5 to 10 meters at the busbar, and 1 to 3 meters at the furnace electrodes), the magnetic energy harvesting device may be located a distance from the source that is many times greater than the diameter of the coil used by the harvesting device, and the frequency of the time-varying magnetic field is relatively low such as 50 or 60 Hz.

Irregularities in the changes in magnetic field direction and flux in an electric metallurgical furnace environment can be caused by a number of features unique to that environment, including the presence of electrodes spaced at a great distance from one another with each electrode generating its own magnetic field, metal content in the materials being heated, metal furnace structural components, and other metal elements/infrastructure typically needed for operating the furnace. For example, FIG. 2 shows a metal beam roof support structure 206 through which the electrodes 202 pass. This structure 206 is covered with magnetic field lines showing a magnetic field having irregular directions. Metal alters the path of a magnetic field, and can generate its own smaller magnetic field if a current is induced therein. There are typically many metal structures and elements in an electric metallurgical furnace environment such as support beams, heavy cables, brackets and Junction boxes. The magnetic field, and the changes in that magnetic field (direction and magnitude) at a particular location, can be difficult to predict and can vary significantly over time for a particular location because of these metal features. Also, the current conducted through the electrodes will vary in time not only because the line frequency is approximately 50 or 60 Hz but also because there can be an arc at the electrode tips that will cause very irregular conduction further altering the time-varying magnetic field.

Figure 3A:
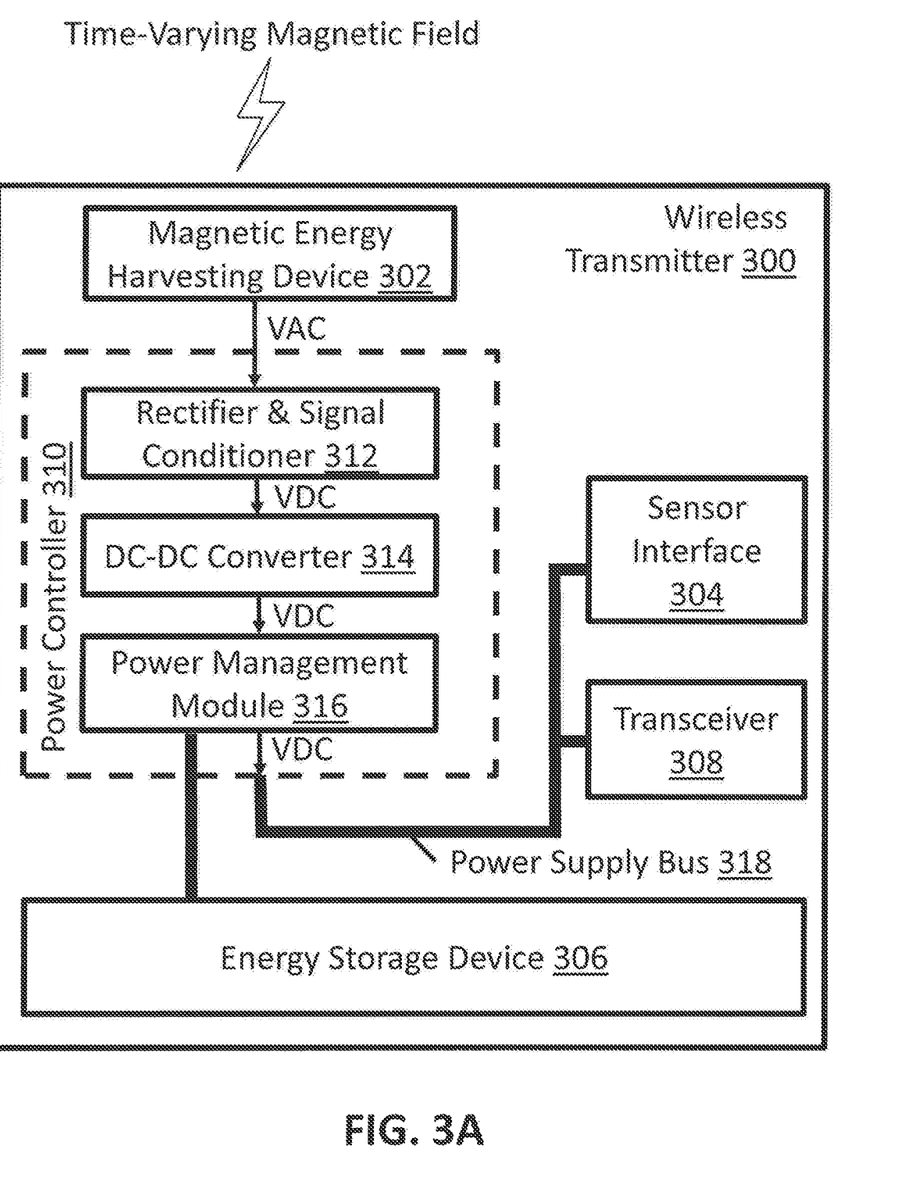
FIG. 3A shows a block diagram representation of a power system for a wireless transmitter according to an embodiment of the present disclosure.

FIG. 3A shows a block diagram representation of a power system portion of a wireless transmitter 300 according to an embodiment of the present disclosure. The transmitter 300 comprises a magnetic energy harvesting device 302, a sensor interface 304, an energy storage device 306, a transceiver 308, and a power controller 310. A power supply bus 318 connects the power controller 310 to the transceiver 308 and the sensor interface 304. The power supply bus 318 may be a separate supply bus to each of the sensor interface 304, transceiver 308, and energy storage device 306 with each such power supply bus being managed independently by the power management module 316.

The sensor interface 304 is for receiving readings of environmental and process conditions from a sensor connected thereto. The sensor interface 304 may be connected to one or more sensors. A sensor may be, for example, a thermocouple, a vibration sensor, a voltage meter, a current meter, a humidity sensor, a force sensor, a pressure sensor, a magnetic field strength sensor, a level sensor, a position sensor, a flow sensor, a speed sensor, an angle sensor, an electrical field strength sensor, a concentration sensor, an open/close indicator, a limit switch, a hand switch, a rotary encoder, or any high or low threshold measurement device. The sensor may be integrated with the transmitter 300, or may be physically separated from the transmitter 300 by a distance.

The transceiver 308 may be a wireless transceiver. A wireless transceiver 308 may be any combination of hardware and software which receives data corresponding to the sensor readings and wirelessly transmits that data to a wireless base station. As shown in FIG. 1, the readings from the transmitter 300 are typically received by a wireless base station 140 located somewhere within the environment.

A magnetic energy harvesting device in accordance with an embodiment of the present disclosure is specifically configured to harvest the magnetic energy occurring in an electric metallurgical furnace environment to power a low-power electronic device. For example, as shown in FIG. 3A, a magnetic energy harvesting device may be specifically configured to power a wireless transmitter. The environment, and the unique characteristics of the magnetic energy occurring in such an environment, requires the magnetic energy harvesting device to have certain properties to harvest enough energy to power the selected electronic device. As discussed above, in an electric metallurgical furnace environment the direction and magnitude of the magnetic field can vary significantly and unpredictably from location to location, and at the same location over time. The magnetic flux density at any location within a metallurgical furnace environment may be 0.2 millitesla (mT).

Furthermore, if the magnetic energy harvesting device comprises a coil, the coil may need to be limited in size, shape, and/or weight to be practically usable with an electronic device in a metallurgical furnace environment. For example, an electronic device such as a transmitter may need to be placed in a certain location in a particular orientation due to physical environment constrains (e.g. to get the transmitter to fit in a tight spot) and/or to obtain a specific measurement (e.g. a temperature measurement of a particular portion of the environment). For example, the weight of the coil may need to be limited so that an individual can carry the transmitter to remote locations within the environment for installation. For example, the weight of the coil may also need to be limited to minimize the strength of the support to which the device is to be affixed or mounted within the environment. For example, the size of the coil may also need to be limited so a standard electronic device can be installed in a wide variety of locations within the environment so as not to require customization of the coil and/or device for different locations. For example, certain locations within the environment which need to be monitored may have physical space constraints. Furthermore, it is beneficial for the installer (such as an instrument technician) of a device in the environment to not be required to tune or orient the device and/or coil during installation, or after installation in response to a change in the furnace operating conditions. A smaller coil will also require less conductive material (such as copper), thus reducing the cost of the coil and device.

In an embodiment, the weight of the coil of a magnetic energy harvesting device is less than 1.5 kilograms and the outer diameter of the coil is less than 1 meter. In another embodiment, the weight of the coil is less than 1.5 kilograms, and the outer diameter of the coil is less than 25 centimeters. In another embodiment, the weight of the coil is less than 1.5 kilograms, and the outer diameter of the coil is less than 10 centimeters. In an embodiment, the coil 302 is configured to harvest energy from a time-varying magnetic field having field directions which vary other than by 180 degrees in direction between cycles, and has varying flux densities over a period of time. The energy harvested by the coil may be sufficient to meet the power demands of a transmitter for the particular environment, including any power requirements of a sensor and a wireless transceiver, and taking into consideration any energy storage or energy buffering devices on the transmitter. The amount of power required by a transmitter 300 may be between 100 and 1500 microwatts (µW).

In an embodiment, a coil of a magnetic energy harvesting device is comprised of an insulated conductive wire, such as a magnet wire, wound in loops. A magnet wire is typically insulated with an enamel coating. The coil wire may be wound in loops to form a multilayer coil defining a plane (also referred to herein as a wire winding). Where the wire winding of the coil has a 10-centimeter outer diameter (measured relative to the exterior edge of the coil) and is used in an environment with electrodes operating around 60 Hz alternating current, the coil may comprise a wire having between 3700 turns at a gauge of 28 AWG, and 21,000 turns at a gauge of 39 AWG. Where the same wire winding of the coil has a 25-centimeter outer diameter, it may comprise a wire having between 210 turns at a gauge of 20 AWG, and 11,000 turns at a gauge of 36 AWG.

There is a trade-off between magnetic flux sensitivity and power output when specifying the properties of a magnetic energy harvesting device in accordance with an embodiment of the present disclosure. Where the magnetic energy harvesting device comprises a coil, the coil may be configured to be more sensitive to magnetic flux so it is better able to harvest, for example, a weaker magnetic field from a distant magnetic field source, or a magnetic field with a variable field strength. For example, more sensitive coils comprise wires having a greater number of turns at higher gauges (smaller diameter wire). Such sensitive coils, however, yield a lower maximum power output, even when the source is nearby. This lower maximum power output is due to a sensitive coil having a higher internal resistance. In an embodiment, the magnetic field strength is measured at various locations within an electric metallurgical environment, and the coil is configured in accordance with the range of measured magnetic field strengths. In an embodiment, the coils for a particular environment are designed to output sufficient power for the type of device with which it is being used in that environment and for the lowest magnetic field strength detected within that environment.

Referring again to FIGS. 3A and 3B, the wireless transmitter 300 may be installed at a location within the furnace environment. The location may be between a 2-meter and 200-meter radius of a furnace electrode. The location may also be on an electrode itself. During operation of the furnace, the time-varying magnetic field is received by the magnetic energy harvesting device 302. Receiving a time-varying magnetic field can simply occur as a result of the device 302 being within an area where the field is present. This time-varying magnetic field causes an alternating current to be induced in the device 302. The alternating (and possibly widely varying in magnitude) current is received by the power controller 310. The power controller 310 converts the alternating current into a stable direct current and scales the voltage required to power the transmitter 300. In an embodiment, the power controller 310 comprises a combination rectifier and signal conditioner 312 which receives the alternating current and outputs a direct current (DC). The direct current (DC) output of the rectifier and signal conditioner 312 is received by a DC to DC (DC-DC) converter 314 which scales the voltage out of the rectifier and signal conditioner 312. The output of the DC-DC converter 314 is then received by a power management module 316. The rectifier and signal conditioner 312, the DC-DC converter 314, the power management module 316 and all or a portion of the power supply bus 318 may be maintained on a printed circuit board. The power management module 316 controls the amount of electrical power going to each of the power supply bus 318 and the energy storage device 306. The energy harvested by the coil 302 may be used directly by the electronic components of the wireless transmitter 300 or stored in the energy storage device 306 for later use. The power supply bus 318 supplies electricity to the sensor interface 304, the energy storage device 306, the transceiver 308, and the power controller generally. The power management module 316 may connect to the energy storage device 306 via a connection separate from the power supply bus 318. A DC-to-DC converter may be provided between the power management module 316 and the power supply bus 318. The logic module 356 in FIG. 3B may be connected to each of the foregoing elements 316 via a control line to individually control the amount of power they receive or consume.

At the power management module 316 in FIG. 3A, the DC electricity received from the DC-DC converter 314 may be directed to the energy storage element 306 or to the power supply bus 318 or both, in a proportion determined by the power management module 316. In one embodiment, the power management module 316 may take the form of a battery extender. That is, the power management module 316 may not be configured to direct the DC electricity received from the DC-DC converter 314 to the energy storage element 306. Instead, the power management module 316 may simply act as a switch to either direct the DC electricity received from the DC-DC converter 314 to the power supply bus 318 or direct the DC electricity received from the energy storage element 306 to the power supply bus 318.

The energy storage device 306 may be used as a short-term buffer to ensure that a sufficient baseline amount of electrical power is available to operate the transmitter 300. This can help if there are intermittent fluctuations in the density and/or direction of the magnetic field which could result in drops or spikes in the power available from the coil. For example, the energy storage device 306 may provide between 5 and 30 seconds of stand-by power. In another embodiment, the energy storage device 306 may have a large capacity to power the industrial instrument 300 for a longer period of time either on stand-by mode or active mode. For example, the energy storage device 306 may store a sufficient amount of power so the transmitter 300 can operate for one or more days without receiving any power from the magnetic energy harvesting device. In another embodiment, the energy storage device 306 is used to build-up a threshold voltage or power level to permit to the transmitter 300 to perform an operation which requires a higher supply power than the coil is able to supply at any given time. The operation may only be performed for a select period of time. The operation may also only be performed on a periodic basis. A higher power operation may involve, for example, exciting a material to emit electromagnetic radiation, such as emitting a laser beam. For example, transmitting data from a wireless transmitter 300 to a base station/centralized monitoring and control system requires a burst of power much greater than the average power consumption of the transmitter 300. The energy storage element 110 may be used to build up over a period of time the amount of power required to transmit data to a base station. The energy storage element 110 may be, for example, a capacitor (such as a smoothing capacitor, a decoupling capacitor, or a super capacitor), or a rechargeable battery. The power management module 316 may be configured to enable the foregoing power management functions.

There may be a correlation between how frequently a sensor is read by the transmitter 300, and how much power the transmitter 300 consumes. There may also be a correlation between how frequently a wireless transmitter transmits its data to a base station/centralized monitoring and control system, and how much power the transmitter 300 consumes. The correlations may be almost linear for certain transmitters. In other words, power can be conserved by reducing the frequency at which a sensor is read and/or data is transmitted wirelessly. In an embodiment, the frequency at which a sensor is read and/or data is wirelessly transmitted by the wireless transmitter 300 is selected according to the rate at which power is generated by the coil 302.

Figure 3B:
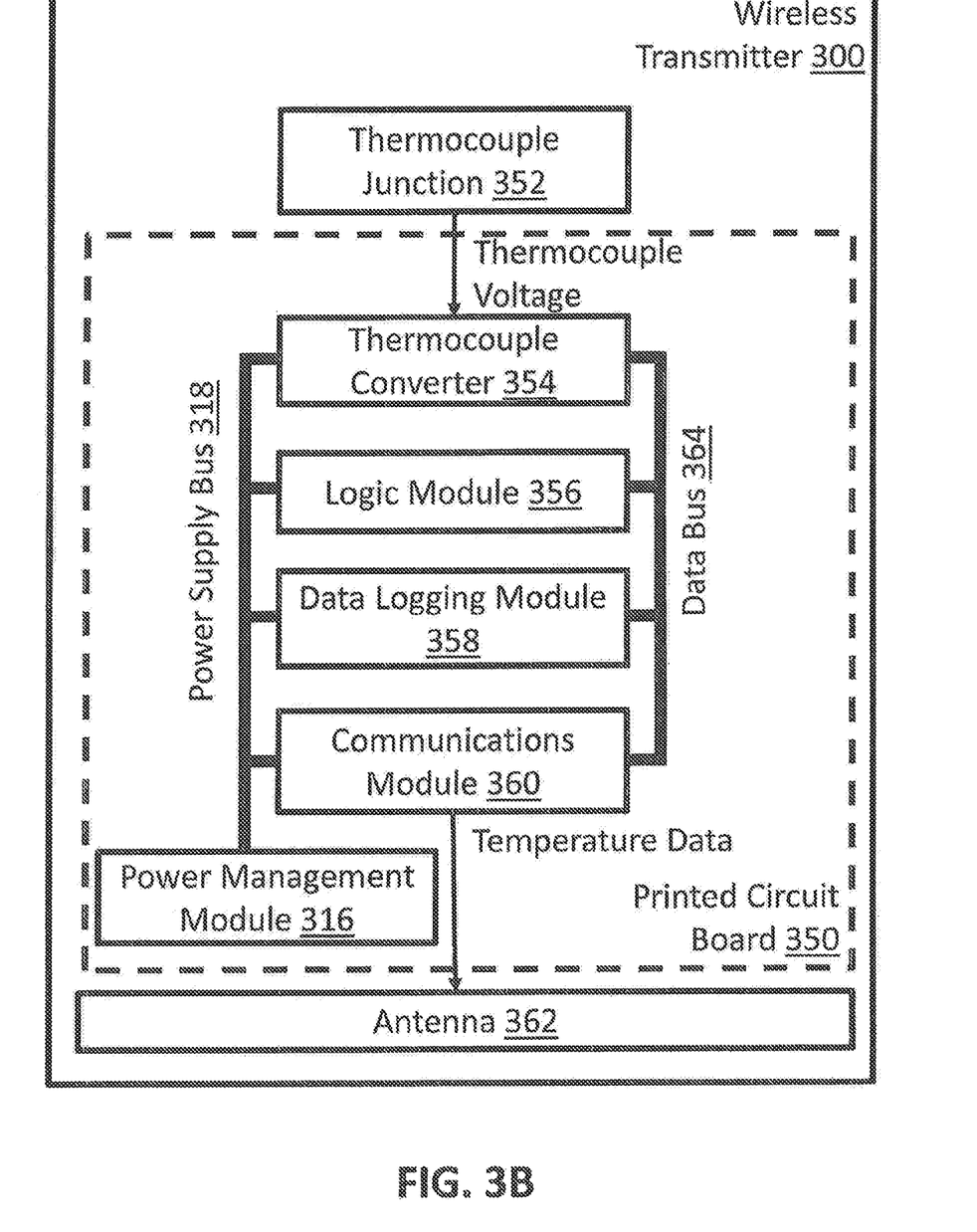
FIG. 3B shows a block diagram representation of data components of the wireless transmitter of FIG. 3A adapted for connecting to a thermocouple sensor.

The wireless transmitter 300 may also have a measurement converter 354. The measurement converter may be a thermocouple converter where it is connected to a thermocouple junction. The measurement converter may also be powered by the power supply bus 318. The measurement converter receives an electrical signal representative of a measurement from the sensor 352, and transmits data representative of the measurement on a data bus 364. The transmitter 300 may also comprise a microcontroller powered by the power supply bus 318 and configured to receive data from the data bus 364 and process the data for transmission to a base station/centralized monitoring and control system via the transceiver 308. Components of the sensor 352 and the transceiver 308 may reside on the same printed circuit board.

FIG. 3B shows a block diagram representation of data components of the wireless transmitter 300 of FIG. 3A adapted for connecting to a thermocouple sensor. The transmitter 300 comprises a thermocouple input for connecting to the thermocouple junction 352. A thermocouple converter 354 is connected to the thermocouple input. The thermocouple converter 354 is connected via a data bus 364 to a logic module 356 and a data logging module 358. The data bus 364 also connects the logic module 356 to a communications module 360. The data logging module 358 stores readings from the thermocouple junction 352. The data logging module 358 and the logic module 356 may be integrated to reside on a single microcontroller. The communications module 360 maintains a connection to an antenna 362. The communications module 360 and the antenna 362 may be part of the transceiver 308. The thermocouple converter 354, the logic module 356, and the communications module 360 may be maintained on the same printed circuit board 350. In an embodiment, the antenna 362 may also be on the printed circuit board 350. The printed circuit board 350 may also comprise the rectifier and signal conditioner 312, the DC-DC converter 314, and the power management module 316. Each of the thermocouple converter 354, the logic module 356, and the communications module 360 may receive electrical power via the power supply bus 318. The logic module 356 may be implemented as a microcontroller, as an application specific integrated circuit (ASIC), or with discrete transistors.

Operation of the thermocouple junction 352 is based on the principle of the Seebeck Effect. An electrical potential difference (i.e., a voltage) may be received at the thermocouple input based upon a temperature difference between a hot side (at the thermocouple junction) and a cold side at the thermocouple converter 354. The voltage at the thermocouple junction 352 may be seen to increase as the temperature difference ($\Delta T$) between the hot side and the cold side increases.

In operation, a voltage representative of a temperature is received at the thermocouple converter 354 from the thermocouple junction 352. A value corresponding to the temperature is communicated from the thermocouple converter 354 to the logic module 356 via the data bus 364. The logic module 356 may reformat the value received as a temperature reporting signal for transmission to the base station/centralized monitoring and control system and communicate the temperature reporting signal to the communications module 360 via the data bus 364. The communications module 360 may then communicate via the antenna 362 a wireless signal representative of the temperature reporting signal.

The communications module 360 may, for example, communicate with the centralized monitoring and control system (not shown) using a protocol such as the WirelessHART wireless communications protocol. The WirelessHART protocol is an industrial wireless instrumentation protocol suitable for low power applications.

Figure 4:
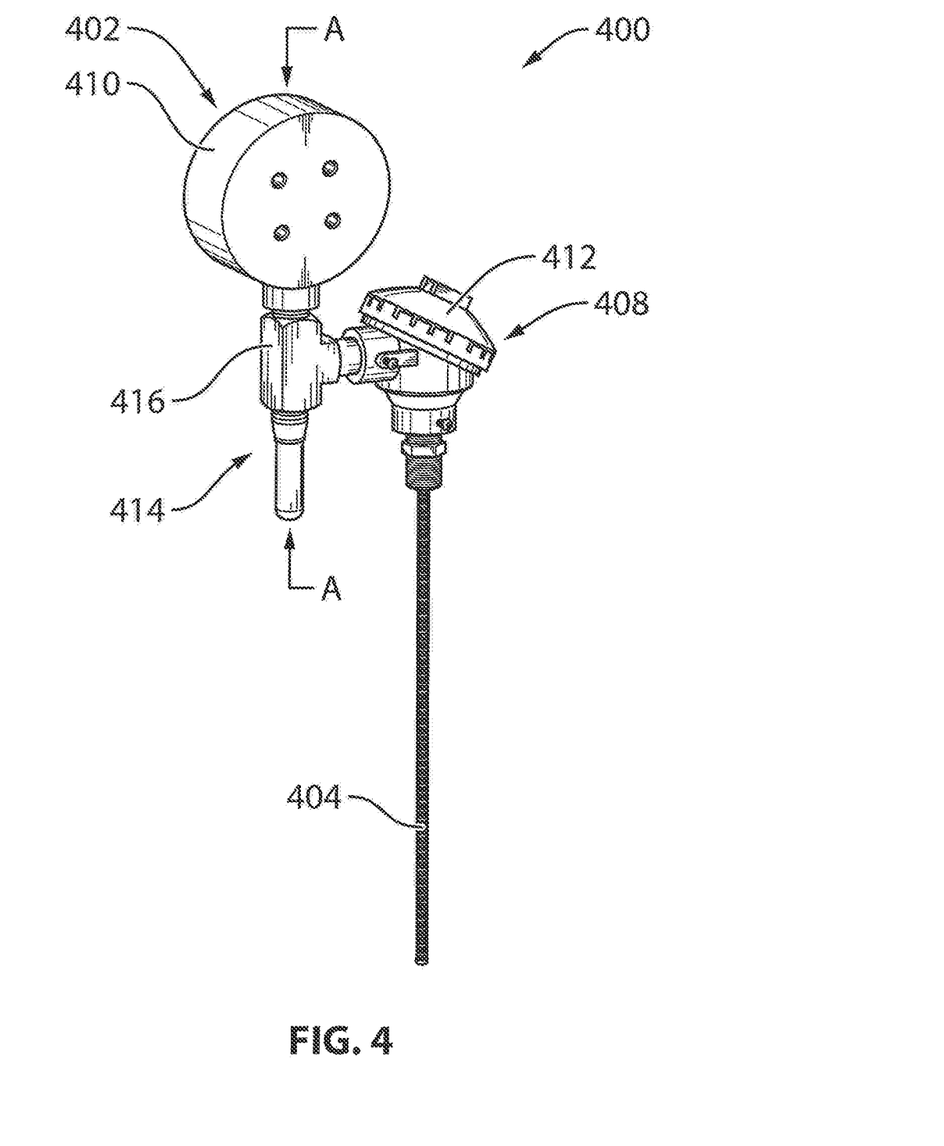
FIG. 4 shows a wireless integrated industrial instrument according to an embodiment of the present disclosure.

FIG. 4 shows a wireless integrated industrial instrument 400 in accordance with an embodiment of the present disclosure. The integrated instrument 400 is for sensing temperature within an electric metallurgical furnace environment without the use of any external wires to power the instrument or for data communication. The wireless integrated instrument 400 comprises a magnetic energy harvesting device 402, a thermocouple 404, and a transmitter 408. The magnetic energy harvesting device 402 comprises a coil housing 410 which encompasses a coiled wire within. The transmitter 408 is enclosed in a transmitter housing 412. The transmitter housing 412 may also enclose an energy storage device such as a battery and an antenna 414. The thermocouple 404 extends from the transmitter housing 412. The harvesting device 402 and transmitter 408 are connected to one another via wires passing through a conduit 416.

The coil of the harvesting device 402 is positioned at a distance of about 10 centimeters from other conductive or magnetically permeable materials, such as the transmitter 408 and the thermocouple junction 404. This is so that another element does not materially negatively affect the magnetic flux densities around the coil and thereby unnecessarily decrease the power harvested by the coil. Spacing of the antenna 414 from other conductive or magnetically permeable materials may help ensure good signal quality from the antenna and limit interference.

Figure 5:
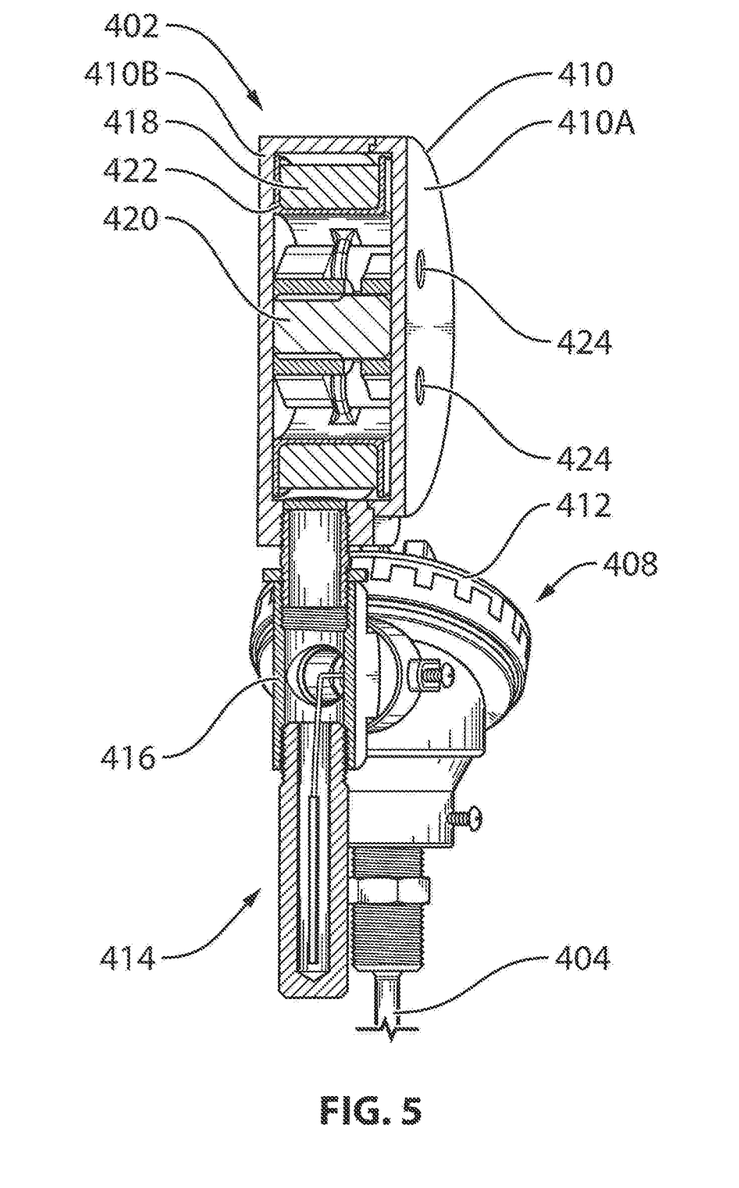
FIG. 5 shows a cross section perspective view of the integrated instrument of FIG. 4, taken along cut-lines A-A.

FIG. 5 shows a cross section perspective view of the integrated instrument 400 of FIG. 4, taken along cut-lines A-A. The coil of the harvesting device 402 comprises a wire 418 that is wound in loops. A core 420 is also provided. The core may be part of the integrated instrument 400 or the harvesting device 402. The core 420 has a higher magnetic permeability than air. The core 420 may be a ferrous material such as iron. In an embodiment, the core 420 increases the range of magnetic field directions from which the coil is able to harvest energy to provide a threshold power output for the wireless integrated instrument 400. The core 420 accomplishes this by redirecting the direction of the magnetic field within the coil so that it is more optimally oriented relative to the wound wire 418 for energy harvesting. The core 420 also helps gather and focus a magnetic field through the centre of the wound wire 418 so that the flux density in that location is greater than what it would be without the presence of the core. A coil provides a higher power output when the plane of the coil is oriented perpendicular to the magnetic field direction within the vicinity of the coil. The material of the core 420, which has a higher magnetic permeability than air, causes the magnetic flux to flow through the core 420 so that the magnetic flux within the core 420 runs axially through the core 420. In this way, the core 420 reorients the direction of the magnetic field closer to the axis of the wound coil 418, normal to the plane of the coil. Due to this effect, a core is especially helpful for harvesting magnetic field energy with a coil in electric metallurgical furnace environments and environments having a similar time-varying magnetic field. This is because such environments/applications tend to have magnetic fields with field directions and strengths that can vary widely at a particular location over time, and from location-to-location within the environment. Also, transmitters and/or sensors in such environments may need to be placed at a particular location and/or in a particular orientation due to physical or environment sensing constraints. Accordingly, in a metallurgical furnace environment or environments with a similar time-varying magnetic field, it is helpful to have a coil which is capable of harvesting magnetic energy to produce a threshold power output irrespective of the orientation of the coil relative to the original direction of the magnetic field.

Referring again to FIG. 5, the coil housing 410 comprises an integrated support structure 422 about which the wire 418 is wrapped. The coil housing 410 may comprise a first housing half 410A and a second housing half 4108. The two halves 4108, 410B may be fastened together with bolts and nuts 424 passing through the middle of coil 402. If the bolts and nuts 424 have a higher magnetic permeability than air, they can also act like a core by redirecting the magnetic field lines so that they are optimally aligned with the coil 402.

Figure 6:
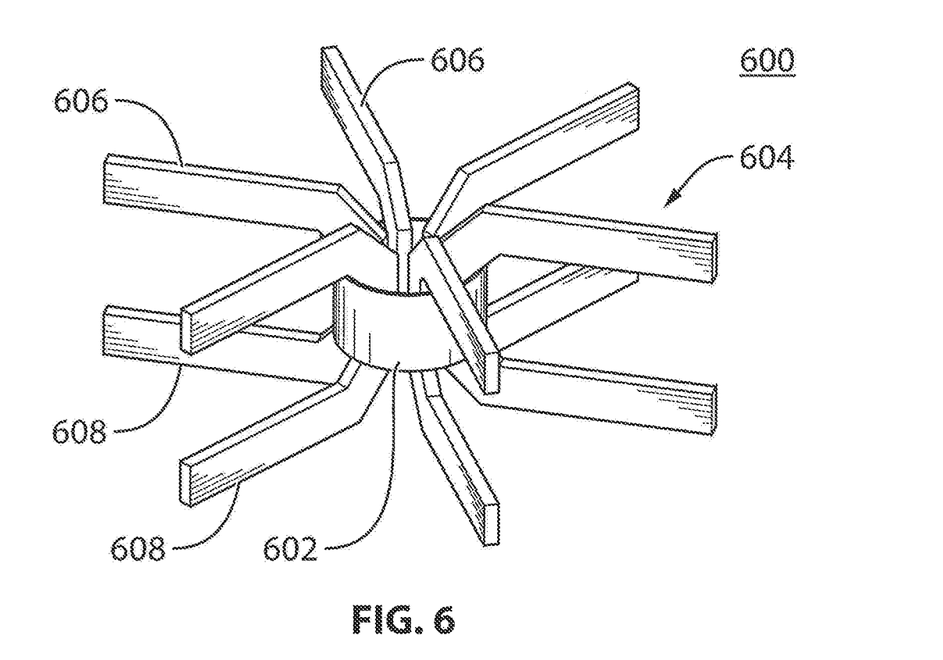
FIG. 6 shows a perspective side view of a portion of a magnetic energy harvesting device comprising a wire winding and a core according to an embodiment of the present disclosure.

FIG. 6 shows a portion of a magnetic energy harvesting device 600 comprising a wire winding 602 forming a coil, and a core 604 in accordance with an embodiment of the present disclosure. The core 604 comprises a plurality of ends 606, 608 which extend outward, beyond both the length and the circumference of the wire winding 602. Each of the ends 606, 608 extend in a different direction. In an embodiment, the core 604 comprises a plurality of C-shaped metal bars, with the two arms of each bar extending in a different direction than the arms of the other bars. In another embodiment, the core 604 comprises a plurality of S-shaped metal bars. In another embodiment the core is in the shape of a dumbbell. The outwardly extending ends help redirect the magnetic field from across a larger area by focusing and orienting that field so that its direction runs through the middle of the wire winding 602. Not only does the core 604 help optimally orient the field direction relative to the harvesting device 600, but it also concentrates the magnetic flux density within the middle of the wire winding 602. The higher the magnetic flux density through the middle of the wire winding, the greater the power output by the coil. Having each of the ends 606, 608 extend in a different direction also helps redirect magnetic field lines through the centre of the wire winding irrespective of the original direction of those field lines relative to the coil. This makes the coil more adaptable to help it be placed at a location within an environment without regard to the orientation of the coil relative to the predominant directions of the magnetic field at that location.

Figure 7:
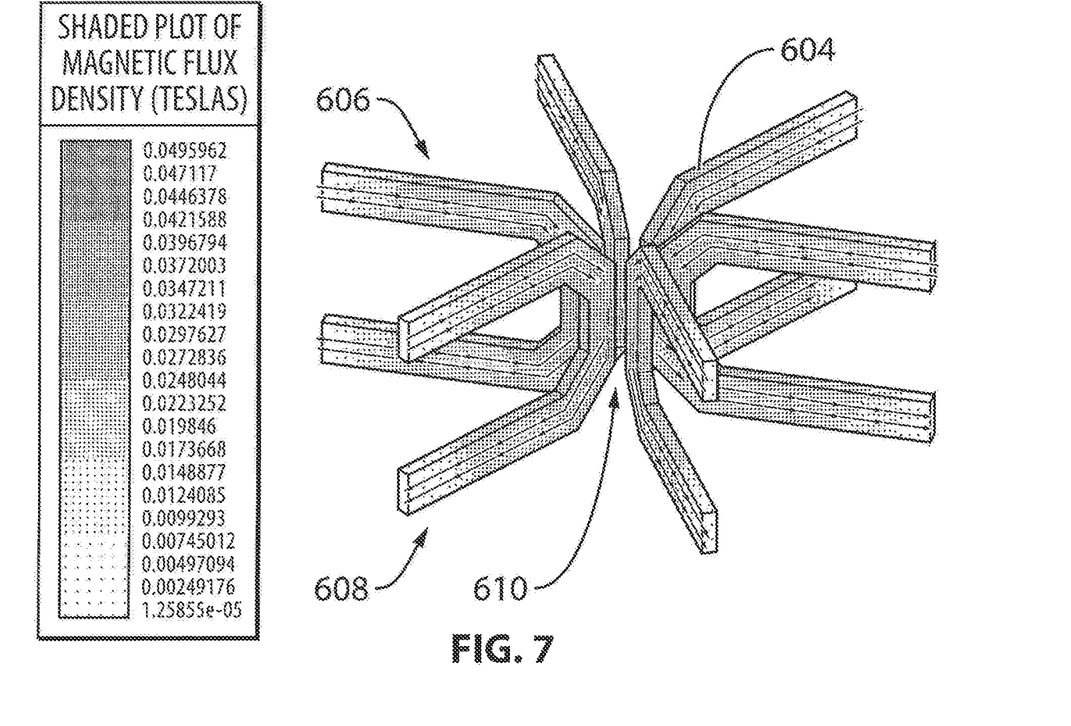
FIG. 7 shows a perspective side view of the core of FIG. 6, overlaid with representations of the magnetic flux density and magnetic field direction across the surface of the core.

FIG. 7 shows the core 604 of FIG. 6, overlaid with representations of the magnetic flux density and magnetic field direction across the surface of the core 604. As shown, the magnetic field enters the edges of a first end 606 of the core 604, follows the contours of each of the bars so as to pass through the core centre 610 about which the coil would encircle, and exits the edges of a second end 608 of the core 604. FIG. 7 also shows the flux density increasing from the ends 606, 608 to the core centre 610, with the core centre having the greatest flux density. In this way, the core 604 concentrates the magnetic flux density in the centre 610 about which the coil would encircle.

In an embodiment, the core is configured to limit the maximum flux density in the core center 610. Limiting the maximum magnetic flux helps limit the power output of the coil to, for example, inhibit damage to downstream electronic components by avoiding power surges from magnetic fields having excessive strength. Limiting flux density in the core centre 610 may be accomplished by limiting the cross-sectional area of the core centre 610 so it becomes saturated at the desired maximum flux density.

Figure 8:
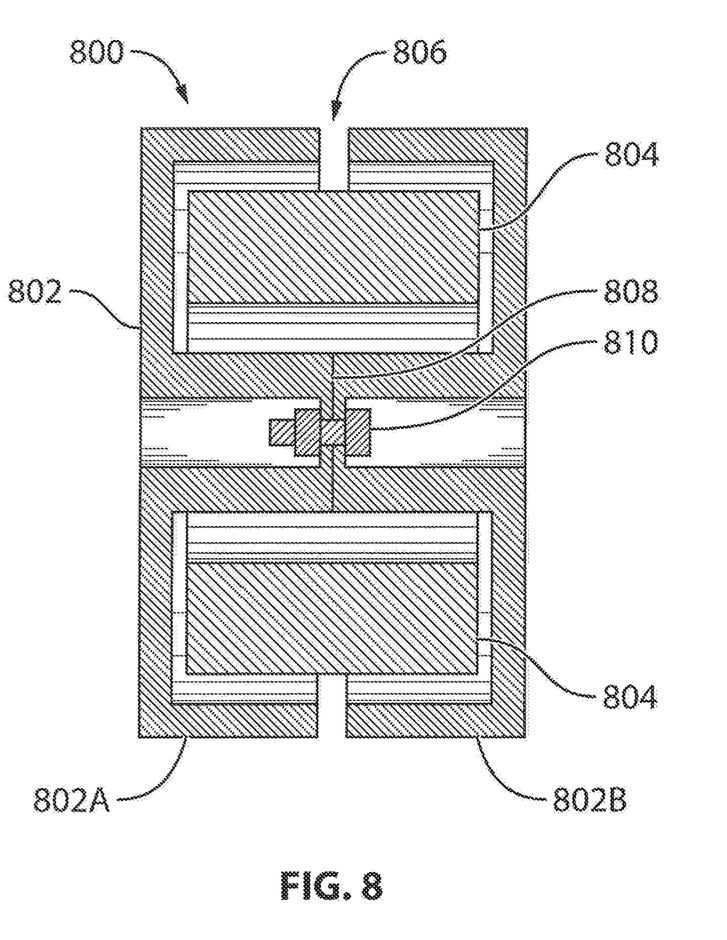
FIG. 8 shows a cross-section side view of a portion of a magnetic energy harvesting device comprising a coil housing which also acts as a core according to an embodiment of the present disclosure.

FIG. 8 shows a magnetic energy harvesting device 800 comprising a coil housing 802 in accordance with an embodiment of the present disclosure. The coil housing 802 also acts as a core by reshaping the magnetic field so that its direction within the vicinity of the coil is normal to the plane of the wire winding 804. The coil housing 802 is composed of a material which has a greater magnetic permeability than air and is shaped in such a fashion so as to redirect the magnetic field direction through, and concentrate the flux density in, the middle of the wire winding 804.

The coil housing 802 comprises a coil housing left half 802A, and a coil housing right half 802B. The two halves 802A, 802B are placed together to resemble the shape of a dumbbell. The halves 802A, 802B are formed such that at their centres 808 within the wire winding 804 they touch, but outside of the wire winding 804 there is a gap 806 therebetween. The gap 806 may be an air gap, or filled with a material that has a lower magnetic permeability than the material of the coil housing 802. Having the gap 806 filled with a material helps seal the interior of the coil (such as the wire winding 804) against the elements. In this way, the core also acts as a coil housing 802 that extends beyond the length of the wire winding 804, and also extends beyond the diameter of the wire winding 804. This allows the coil housing 802 to redirect the magnetic field direction, and concentrate the magnetic field flux, from across a large area through the centre of the wire winding 804. The two halves of the coil housing 802A, 802B may be fastened together with a nut and bolt 810 at their centre. In an embodiment, the middles 808 of the two halves 802A, 802B are a selected diameter which limits magnetic flux density which may be present in the core centre to a threshold amount.

Figure 9:
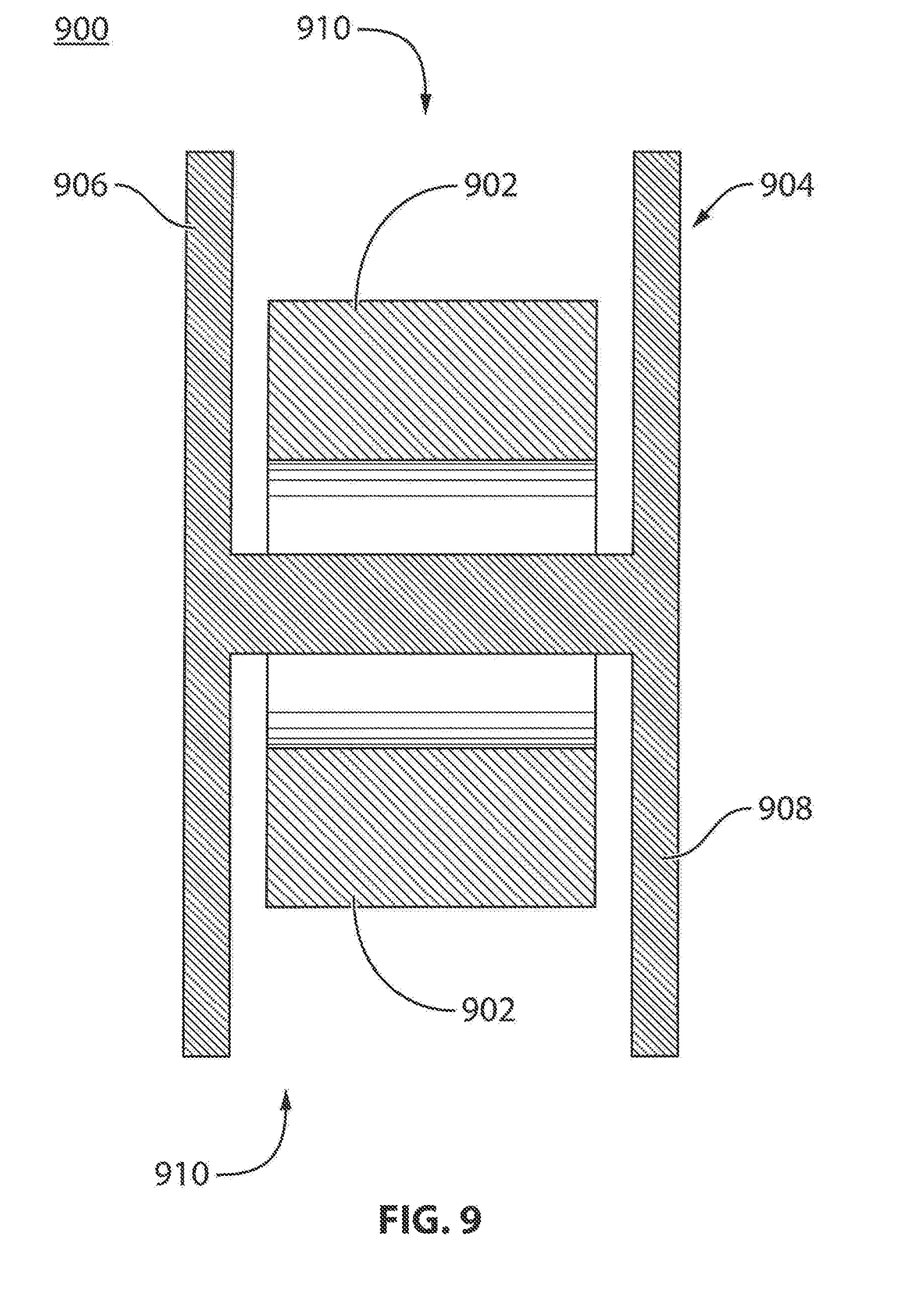
FIG. 9 shows a cross-section side view of a magnetic energy harvesting device comprising a coil and a core with disc-shaped ends in accordance with another embodiment of the present disclosure.

FIG. 9 shows a cross-section side view of a portion of a magnetic energy harvesting device 900 in accordance with another embodiment of the present disclosure. The harvesting device 900 is similar to the harvesting device 600 shown in FIG. 6, the difference being that the harvesting device 900 comprises a core 904 having ends 906, 908 that are discs. The disc-shaped ends 906, 908 are connected at their middles with a bar that passes through the centre of the wound wire 902. A gap 910 between the outer edges of the discs 906, 908 may be an air gap, or filled with a material that has a lower magnetic permeability than the material of the ends 906. Filling the air gap with a material helps seal the interior of the harvesting device against the elements by providing a complete enclosure for the interior of the harvesting device 900, such as the wound wire 902.

In an embodiment of the present disclosure, the magnetic energy harvesting device may be combined with any low-power device used in an electric metallurgical furnace environment or an environment having a similar time-varying magnetic field. For example, the harvesting device may be used to power a remote sensor, a sensing instrument, a network access point, a network gateway, a wireless base station, or a data acquisition device.

In another embodiment, an electronic device (such as a wireless transmitter) is disconnected from existing power cabling and retrofitted with a magnetic energy harvesting device 302. The retrofitted electronic device may also require a power controller 310 to convert the voltage and current from the coil to what is required by the electronic device.

In an embodiment, a magnetic energy harvesting device 302 is used to power an electronic device in another industrial environment which experiences a time-varying magnetic field which is similar to the time-varying magnetic field present in an electric metallurgical furnace environment.

We claim:

1. An electronic device, comprising:
   an interface for receiving sensor readings;
   a transmitter configured to transmit the sensor readings to a remote device; and
   a magnetic energy harvesting device comprising a conductor configured to generate electricity when in the presence of an irregular time-varying magnetic field from an industrial source, the magnetic energy harvesting device electrically connected with the electronic device to power the interface to receive the sensor readings and to power the transmitter to transmit the sensor readings.

2. The electronic device of claim 1, wherein the magnetic energy harvesting device is configured to electrically power the electronic device in response to a time-varying magnetic field from an electrical component of a metallurgical electric furnace.

3. The electronic device of claim 1, wherein the electronic device is a wireless transmitter, and the interface is a sensor interface for receiving the sensor readings from a sensor, the electronic device configured to wirelessly transmit the sensor readings to a remote device.

4. The electronic device of claim 3, wherein the magnetic energy harvesting device is configured to supply a minimum of 300 microwatts of electrical power to the electronic device.

5. The electronic device of claim 3, wherein the magnetic energy harvesting device is configured to supply a minimum of 300 microwatts of electrical power to the electronic device in response to a minimum magnetic flux density of 0.2 millitesla, at an average frequency of approximately 50 or 60 hertz.

6. The electronic device of claim 1, wherein the conductor of the magnetic energy harvesting device comprises a coil, the harvesting device configured to electrically power the electronic device in response to a time-varying magnetic field of a metallurgical furnace having a powered electrode that is located from the coil a distance that is greater than 10 times the outer diameter of the coil.

7. The electronic device of claim 1, wherein the magnetic energy harvesting device is configured to power the electronic device in response to a time-varying magnetic field resulting from a powered electrode and a plurality of metal conductors in a metallurgical furnace.

8. The electronic device of claim 1, wherein the magnetic energy harvesting device is configured to supply less than 1500 microwatts of power to the electronic device.

9. The electronic device of claim 1, further comprising an energy storage device, the energy storage device configured to store excess electrical power supplied by the magnetic energy harvesting device, and output electrical power when the magnetic energy harvesting device supplies less electrical power than required by the electronic device.

10. The electronic device of claim 1, wherein the magnetic energy harvesting device comprises a coil, the coil comprising a magnet wire having a gauge between 20 and 39 AWG.

11. The electronic device of claim 1, wherein the magnetic energy harvesting device comprises a coil, the coil comprising between 210 and 21.000 turns.

12. The electronic device of claim 1, further comprising a core disposed within a coil of the magnetic energy harvesting device, the core comprising a material having a greater magnetic permeability than air, the core to one or more of reorient and concentrate the magnetic field through the coil.

13. The electronic device of claim 12, wherein the core comprises an end extending beyond the circumference of the coil to concentrate the magnetic field strength within the coil.

14. The electronic device of claim 13, wherein the core is a housing for the coil.

15. The electronic device of claim 12, wherein the core comprises an end extending beyond the circumference of the coil in a plurality of directions.

16. The electronic device of claim 15, wherein the core comprises a plurality of C-shaped bars.

17. The electronic device of claim 15, wherein the end is disc-shaped.

18. An electronic device comprising a magnetic energy harvesting device comprising a conductor configured to be induced with electricity, the electricity for powering the device, in response to the conductor being in the presence of a time-varying magnetic field from an electrical component of a metallurgical furnace.

19. The device of claim 18, wherein the device is a wireless integrated industrial instrument, comprising an environment sensor and a wireless transceiver configured to wirelessly transmit readings of the environment sensor to a data acquisition device.

20. The device of claim 18, wherein the device is a data acquisition device.

21. The device of claim 18, wherein the magnetic energy harvesting device is a wire loop or coil.

22. The device of claim 18, wherein the harvesting device comprises conductive metal equipment in the environment of the metallurgical furnace.

23. A magnetic energy harvesting device comprising a coil and a core, the coil configured to be inducted with electricity when in the presence of a time-varying magnetic field from an industrial source, and the core within the coil and comprising an end extending beyond the circumference of the coil to alter the magnetic field to help increase the amount of electricity inducted in the coil.

\* \* \* \* \*